United States Patent
Bergström et al.

(10) Patent No.: US 10,567,993 B2
(45) Date of Patent: Feb. 18, 2020

(54) CONDITIONAL BUFFER STATUS REPORTING

(71) Applicant: Telefonaktiebolaget LM Ericsson (publ), Stockholm (SE)

(72) Inventors: Mattias Bergström, Stockholm (SE); Magnus Stattin, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/736,325

(22) PCT Filed: Aug. 10, 2016

(86) PCT No.: PCT/SE2016/050743
§ 371 (c)(1),
(2) Date: Dec. 14, 2017

(87) PCT Pub. No.: WO2017/026939
PCT Pub. Date: Feb. 16, 2017

(65) Prior Publication Data
US 2018/0167842 A1    Jun. 14, 2018

Related U.S. Application Data

(60) Provisional application No. 62/204,712, filed on Aug. 13, 2015.

(51) Int. Cl.
*H04W 28/02* (2009.01)
*H04W 28/10* (2009.01)
*H04W 72/12* (2009.01)

(52) U.S. Cl.
CPC ....... *H04W 28/0278* (2013.01); *H04W 28/10* (2013.01); *H04W 72/1205* (2013.01); *H04W 72/1284* (2013.01)

(58) Field of Classification Search
None
See application file for complete search history.

(56) References Cited

U.S. PATENT DOCUMENTS

| | | | | |
|---|---|---|---|---|
| 2010/0115355 A1* | 5/2010 | Hsu | ............ | H04W 72/1284 714/726 |
| 2011/0300858 A1* | 12/2011 | Lee | ............ | H04W 8/24 455/425 |
| 2013/0028223 A1* | 1/2013 | Kim | ............ | H04L 5/0007 370/329 |

FOREIGN PATENT DOCUMENTS

| | | |
|---|---|---|
| EP | 2693821 A1 | 2/2014 |
| WO | 2011038768 A1 | 4/2011 |
| WO | 2015047152 A1 | 4/2015 |

OTHER PUBLICATIONS

Uknown, Author, "Over-Scheduling Problem for UL Split Bearer", 3GPP TSG-RAN2 #90 Meeting, R2-152140, MediaTek Inc., Fukuoka, Japan, May 25-29, 2015, 2 pages.
(Continued)

*Primary Examiner* — Christine T Duong
(74) *Attorney, Agent, or Firm* — Murphy, Bilak & Homiller, PLLC

(57) ABSTRACT

There is provided a method for managing buffer status reporting for a wireless communication device in a wireless communication system. The method comprises checking (S1) condition(s) for suppressing at least one Buffer Status Report, BSR, which is up for transmission, and suppressing (S2) the BSR if the condition(s) is/are fulfilled, wherein the BSR is suppressed when the BSR indicates less than or equal to a first threshold amount of bytes and/or when one or more previous BSRs indicate less than or equal to a second threshold amount of bytes.

8 Claims, 6 Drawing Sheets

WIRELESS COMMUNICATION DEVICE

NETWORK NODE

10

BSR →

BS/AP

20

(56) References Cited

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.5.0, Mar. 2015, 1-77.
Unknown, Author, "BSR Triggers", 3GPP TSG-RAN WG2 #60bis, R2-080375, Qualcomm Europe, Jan. 14-18, 2007, 1-3.
Unknown, Author, "Consideration on BSR triggers", TSG-RAN WG2 Meeting #60bis, R2-080400, Sunplus Mobile Inc., Jan. 14-18, 2008, 1-5.
Unknown, Author, "On Cancelling BSR", 3GPP TSG-RAN2 Meeting #62, Tdoc R2-082295, Samsung, May 5-9, 2008, 1-3.
Unknown, Author, "Report on [90#26] [LTE/ProSe] Rel-13 SL BSR trigger and cancellation", 3GPP TSG-RAN WG2 Meeting #91, R2-153231, Huawei, Aug. 24-28, 2015, 1-11.
Unknown, Author, "Scheduling problem with UL split bearer", 3GPP TSG-RAN2 #89bis Meeting, R2-151367, MediaTek Inc., Apr. 20-24, 2015, 1-3.

* cited by examiner

CONDITIONAL BUFFER STATUS REPORTING

TECHNICAL FIELD

The proposed technology generally relates to wireless communications, and more specifically to resource allocation, scheduling and/or buffer status reporting, and in particular a method for managing buffer status reporting for a wireless communication device in a wireless communication system, and a method for controlling buffer status reporting for a wireless communication device and corresponding arrangements, communication units, computer programs, computer-program products and apparatuses.

BACKGROUND

Buffer Status Reporting

In wireless communication systems, such as LTE, the uplink (as well as the downlink) transmissions are scheduled by the network. For LTE, as an example, this means that when and which resources a UE transmits on is indicated by the eNB including other information such as which modulation and coding scheme the UE shall apply, and so forth. For the eNB to be aware of how much resources to schedule the UE on the eNB would need to know how much data the UE has to transmit. For this purpose a buffer status reporting mechanisms is used in LTE according to which the UE sends MAC messages, referred to as MAC Control Elements, to the eNB indicating the size of the UE's uplink buffer.

FIG. 1 is a schematic diagram illustrating an example of buffer status reporting between a wireless communication device and a network node.

Section 5.4.5 of 3GPP TS 36.321 v12.5.0 relates to MAC operation and details the logic applied by a UE when determining when to send Buffer status Reports (BSRs).

WO 2015/047152 relates to a method for handling data transmissions in Long Term Evolution networks, and involves evaluating whether a trigger condition for buffer status reporting is fulfilled, and transmitting status report to radio base station when condition is fulfilled.

The 3GPP Draft; R2-080375, 20080108 3rd Generation Partnership Project (3GPP), Mobile Competence Centre; 650, route des Lucioles; F-06921 Sophia-Antipolis Cedex; France, RAN WG2, Sevilla, Spain; 20080108 discloses different triggers for buffer status reports.

Section 6.1.3.1 of 3GPP TS 36.321 v12.5.0 relates to MAC operation and details the definition of Buffer Status Reports (BSRs).

Pre-Scheduling for Latency Reduction

A way to reduce scheduling latency in LTE is to lower the time for grant acquisition by using various pre-scheduling or semi-persistent scheduling, SPS, strategies. The idea of pre-scheduling, which is supported already in Rel-8 as an implementation choice, is to opportunistically schedule users without scheduling request, SR, when network resources are available. With pre-scheduling, UEs can receive UL grants without the UE having sent, or the network having received, a prior request for an UL grant by the UE. A request could be for instance an SR and/or BSR. With SPS, the network can provide periodic UL grants and/or DL assignments with reduced L1/L2 control compared to dynamic scheduling. SPS can be used for pre-scheduling.

However, there is a general need for more efficient use of the available resources including optimized control signaling and/or increased channel occupancy and/or improved scheduling or resource allocation.

SUMMARY

It is desirable to provide an improved mechanism for buffer status reporting in a wireless communication system.

It is a specific object to provide a method for managing buffer status reporting for a wireless communication device in a wireless communication system.

It is also an object to provide an arrangement configured to manage or perform buffer status reporting for a wireless communication device in a wireless communication system.

It is another object to provide a communication unit, such as a wireless communication device, comprising such an arrangement.

Yet another object is to provide a corresponding computer program, and a computer-program product comprising a computer-readable medium having stored thereon such a computer program.

Still another object is to provide an apparatus for managing buffer status reporting for a wireless communication device in a wireless communication system.

It is also an object to provide a method for controlling buffer status reporting for a wireless communication device in a wireless communication system.

It is another object to provide an arrangement configured to control buffer status reporting for a wireless communication device in a wireless communication system.

Yet another object is to provide a communication unit, such as a network node, comprising such an arrangement for controlling buffer status reporting.

Still another object is to provide a corresponding computer program, and a computer-program product comprising a computer-readable medium having stored thereon such a computer program.

It is also an object to provide an apparatus for enabling control of buffer status reporting for a wireless communication device in a wireless communication system.

These and other objects are met by embodiments of the proposed technology.

According to a first aspect, there is provided a method for managing buffer status reporting for a wireless communication device in a wireless communication system. The method comprises:
  checking condition(s) for suppressing at least one Buffer Status Report, BSR, which is up for transmission, and
  suppressing the BSR if the condition(s) is/are fulfilled,
wherein the BSR is suppressed:
when the BSR indicates less than or equal to a first threshold amount of bytes,
and/or
when one or more previous BSRs indicate less than or equal to a second threshold amount of bytes.

According to a second aspect, there is provided a method for controlling buffer status reporting for a wireless communication device in a wireless communication system. The method comprises:
  triggering or generating a control indication, or command, for enabling control of the buffer status reporting, and
  sending the control indication to the wireless communication device to allow the device to stop sending certain Buffer Status Reports, BSRs.

According to a third aspect, there is provided an arrangement configured to manage buffer status reporting for a wireless communication device in a wireless communication system.

The arrangement is configured to check condition(s) for suppressing at least one Buffer Status Report, BSR, which is up for transmission.

The arrangement is also configured to suppress the BSR if the condition(s) is/are fulfilled, wherein the arrangement is configured to suppress the BSR:

when the BSR indicates less than or equal to a first threshold amount of bytes, and/or when one or more previous BSRs indicate less than or equal to a second threshold amount of bytes.

According to a fourth aspect, there is provided a communication unit comprising such an arrangement.

According to a fifth aspect, there is provided a computer program for managing, when executed by a processor, buffer status reporting for a wireless communication device in a wireless communication system, wherein the computer program comprises instructions, which when executed by the processor, cause the processor(s) to:

check condition(s) for suppressing at least one Buffer Status Report, BSR, which is triggered and up for transmission, and suppress the BSR if the condition(s) is/are fulfilled, wherein the BSR is suppressed:

when the BSR indicates less than or equal to a first threshold amount of bytes, and/or when one or more previous BSRs indicate less than or equal to a second threshold amount of bytes.

According to a sixth aspect, there is provided a computer-program product comprising a computer-readable medium having stored thereon such a computer program.

According to a seventh aspect, there is provided an apparatus for managing buffer status reporting for a wireless communication device in a wireless communication system. The apparatus comprises:

a checking module for checking condition(s) for suppressing at least one Buffer Status Report, BSR, which is triggered and up for transmission, and a suppressing module for suppressing the BSR if the condition(s) is/are fulfilled wherein the BSR is suppressed:

when the BSR indicates less than or equal to a first threshold amount of bytes, and/or when one or more previous BSRs indicate less than or equal to a second threshold amount of bytes.

According to an eighth aspect, there is provided an arrangement configured to control buffer status reporting for a wireless communication device in a wireless communication system. The arrangement is configured to trigger or generate a control indication, or command, for enabling control of the buffer status reporting, and to send the control indication to the wireless communication device to allow the device to stop sending certain Buffer Status Reports, BSRs.

According to a ninth aspect, there is provided a communication unit comprising such an arrangement.

According to a tenth aspect, there is provided a computer program for controlling, when executed by a processor, buffer status reporting for a wireless communication device in a wireless communication system. The computer program comprises instructions, which when executed by the processor, cause the processor(s) to:

trigger or generate a control indication, or command, for enabling control of the buffer status reporting, and output the control indication for transmission to the wireless communication device to allow the device to stop sending certain Buffer Status Reports, BSRs.

According to an eleventh aspect, there is provided a computer-program product comprising a computer-readable medium having stored thereon such a computer program.

According to a twelfth aspect, there is provided an apparatus for enabling control of buffer status reporting for a wireless communication device in a wireless communication system. The apparatus comprises:

a trigger or generating module for triggering or generating a control indication, or command, for enabling control of the buffer status reporting, and an output module for outputting the control indication for transmission to the wireless communication device to allow the device to stop sending certain Buffer Status Reports, BSRs.

The proposed technology provides new and efficient ways of conditionally sending Buffer Status Reports, BSRs. The buffer status reporting mechanism may thus apply a set of one or more novel conditions for determining whether or not to send a BSR. By way of example, the buffer status reporting mechanism may decide to suppress or cancel a BSR if the condition(s) are met.

In other words, the considered communication unit(s) will only send BSRs under certain circumstances, for example to avoid sending BSRs which would cause transmissions and battery drain for no other reason than sending of unnecessary BSR(s).

The proposed technology also relates to a mechanism for at least partially controlling the buffer status reporting from the network side.

The proposed technology generally covers methods and corresponding arrangements, communication units comprising such arrangements, corresponding computer programs and computer-program products as well as corresponding apparatuses.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
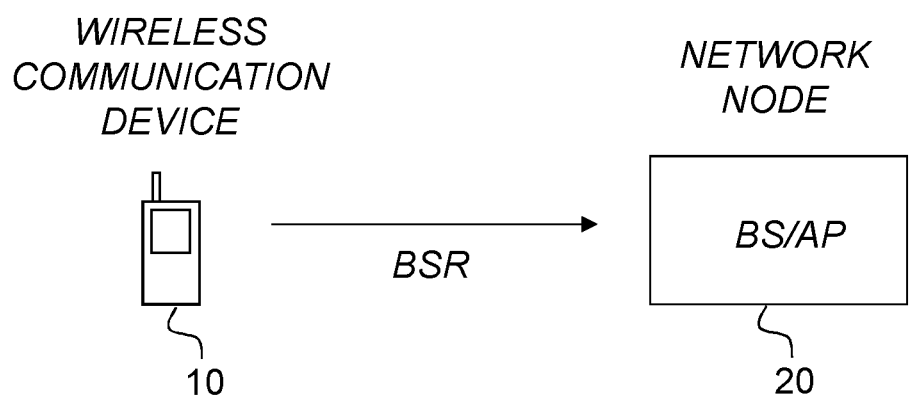
FIG. 1 is a schematic diagram illustrating an example of buffer status reporting between a wireless communication device and a network node.

Throughout the drawings, the same reference designations are used for similar or corresponding elements.

As used herein, the non-limiting terms "User Equipment", "UE", "terminal" and "wireless communication device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE", the term "terminal" and the term "wireless communication device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "network node" may refer to base stations, network control nodes such as network controllers, radio network controllers, base station controllers, and the like. In particular, the term "base station" may encompass different types of radio base stations including standardized base station functions such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

A careful analysis by the inventors have revealed that with the current buffer status reporting mechanism the UE will specifically send periodic BSRs in each TTI when the timer periodicBSR-Timer expires and the UE has valid uplink resources in a TTI. With the pre-scheduling or SPS mechanisms the UE can be provided or configured with uplink resources which can be used on a per need basis. This may result in that the UE sends periodic BSRs unnecessarily often as the UE condition on that the UE should have valid uplink resources will be true more often, and especially more often in cases when the UE anyway does not have any data to transmit compared to when no pre-scheduling is done. These periodic BSRs will not only waste UE power due to additional transmissions, but they also will create more interference and increase channel occupancy which in its turn will make collisions between transmissions more frequent.

It is desirable to avoid unnecessary transmissions and to that end it would under certain circumstances be desirable to generally avoid sending BSRs which would cause a transmission for no other reason than a potentially unnecessary BSR. In other words, it may be beneficial to avoid unnecessary transmission due to unnecessary BSRs. As an example, there may be a situation where a BSR (under certain circumstances) would trigger a transmission which would not be needed for any other purpose than delivering the BSR.

As mentioned, the proposed technology provides new and efficient ways of conditionally sending Buffer Status Reports, BSRs. The buffer status reporting mechanism may thus apply a set of one or more novel conditions for determining whether or not to trigger transmission of a BSR.

Figure 2:
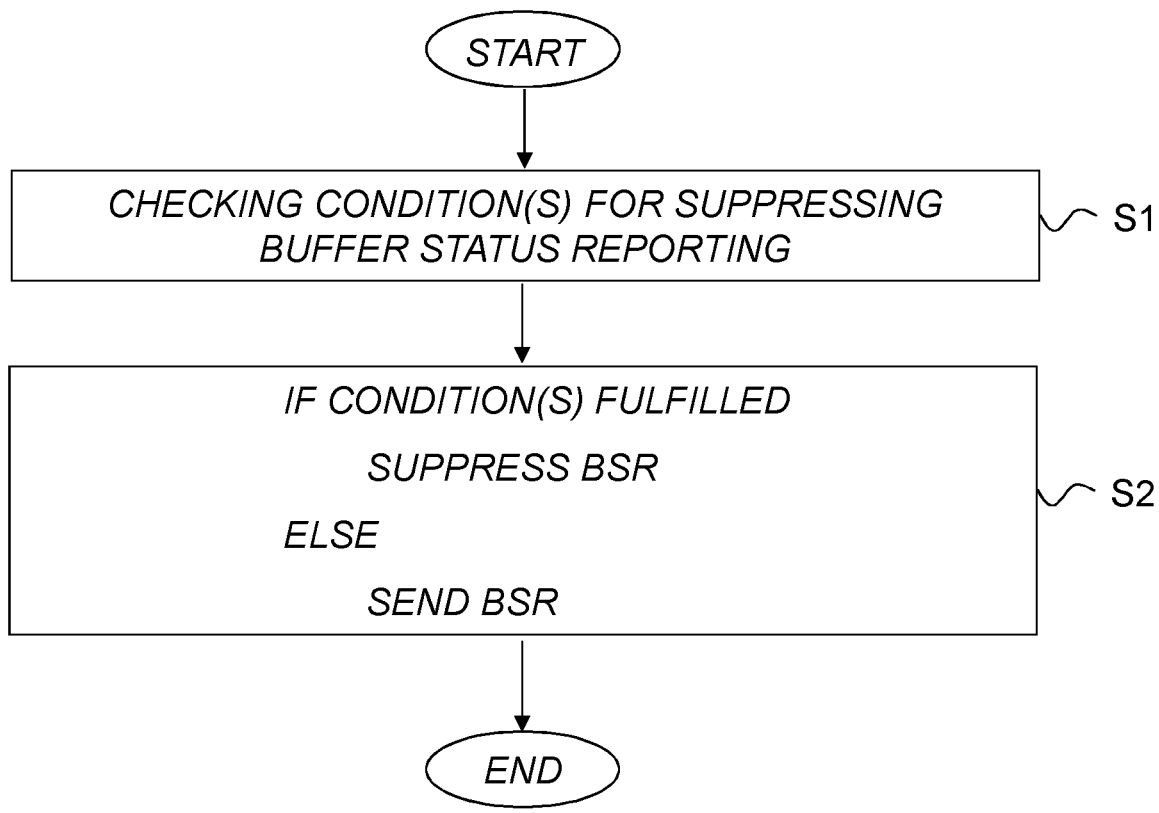
FIG. 2 is a schematic flow diagram illustrating an example of a method for buffer status reporting in a wireless communication system.

FIG. 2 is a schematic flow diagram illustrating an example of a method for buffer status reporting for a wireless communication device in a wireless communication system. The method basically comprises:

S1: Checking condition(s) for suppressing buffer status reporting, i.e. one or more BSRs.

S2: Suppressing the BSR if the condition(s) is/are fulfilled, (else send the BSR).

According to an aspect of the proposed technology, the BSR is suppressed:

when the BSR indicates less than or equal to a first threshold amount of bytes, and/or when one or more previous BSRs indicate less than or equal to a second threshold amount of bytes.

WO 2011/038768 relates to suppression of Scheduling Requests, which differ from Buffer Status Reports. Furthermore, the mechanism disclosed in WO 2011/038768 uses entirely different conditions for suppressing the Scheduling Requests.

EP 2 693 821 discloses methods for when to transmit and when to cancel BSRs. An example is given in which a BSR canceling module cancels a regular BSR in case there are no data to be transmitted.

However, EP 2 693 821 does not check the BSR indication, but rather check if there is data to be transmitted when deciding whether to cancel a BSR.

In this regard, it is important to keep in mind that BSRs transmitted in a TTI reflect the buffer status after all MAC PDUs have been built for this TTI, i.e. reflect the remaining data in the buffer after the upcoming transmission.

For example, if the data buffer includes 80 bytes of data and all data can be transmitted in a TTI, the BSR itself will indicate zero bytes. According to EP 2 693 821, in this case, the BSR will not be suppressed since there is apparently data to be transmitted. However, according to the present invention, the BSR will be suppressed since the condition(s) for suppressing the BSR considers what the BSR itself is indicating, and this reflects the buffer status after transmission.

The 3GPP Draft; R2-082295 on cancelling BSR, 20080429 3rd Generation Partnership Project (3GPP), Mobile Competence Centre; 650, route des Lucioles; F-06921 Sophia-Antipolis Cedex; France, RAN WG2, Kansas City, USA; 20080429 discloses methods for cancelling buffer status reports (BSRs). One example is given in which a threshold is used for determining cancellation of BSRs instead of logical channel prioritization.

The 3GPP Draft; R2-080400, 20080108 3rd Generation Partnership Project (3GPP), Mobile Competence Centre; 650, route des Lucioles; F-06921 Sophia-Antipolis Cedex; France, RAN WG2, Sevilla, Spain; 20080108 discloses a method in which a BSR, that would signal that the buffer is empty, could be cancelled to save data for other logical channel groups.

A corresponding computer program will check the condition(s) and either suppress the BSR if the conditions are met or else output/prepare the BSR for transmission.

The proposed technology may alternatively be regarded as a method for triggering buffer status reports.

It should be appreciated that the terms suppress, drop, and cancel a BSR may be used interchangeably.

For example, only a certain type or types of previous BSRs may be considered when determining whether the previous BSR(s) indicate less than or equal to a threshold amount of bytes. This could be for example periodic BSRs, as will be discussed later on.

In a particular example, the BSR is suppressed:
when the BSR indicates that the wireless communication device has less than or equal to Z bytes in the buffer(s), where Z is a value equal to or larger than zero, and/or
when the X most recent BSR(s) transmitted by the wireless communication device indicated less than or equal to Y bytes in the buffer(s), where X is an integer equal to or greater than 1 and Y is a value equal to or greater than zero.

Optionally, if only a BSR indicating less than or equal to a threshold amount, Z, of bytes of data is up for transmission that BSR is suppressed.

In another example, the BSR is suppressed if the X most recent BSR(s) has indicated zero, or less than or equal to Y bytes of data.

In yet another example, the BSR is suppressed when the X most recent BSR(s) indicated zero, or less than Y bytes of data in the buffer(s), unless the wireless communication device has data in its buffer.

In a particular example, the BSR up for transmission is a BSR for which a timer has expired and/or the wireless communication device has valid uplink resources for transmitting the BSR.

As an example, the BSR planned for transmission may be a periodic BSR.

For example, the wireless communication device will only send a periodic BSR if the wireless communication device has data to transmit and a previous BSR did not indicate less than or equal to a second threshold amount of bytes, otherwise the periodic BSR will be suppressed.

In an alternative embodiment the UE would, in the above example only send a periodic BSR if the wireless communication device has data to transmit and a previous periodic BSR (i.e. not just any type of BSR) did not indicate less than or equal to a second threshold amount of bytes, otherwise the periodic BSR will be suppressed.

In an optional embodiment, the periodicity of the BSR reporting may be changed if the condition(s) is/are fulfilled.

As will be discussed later on, the step of suppressing the BSR may include at least temporarily refraining from sending the BSR or dropping the BSR.

In another optional embodiment, the suppressing step may be performed only if the wireless communication device has received a network indication from the network allowing the wireless communication device to perform the suppressing step.

By way of example, the method may be performed depending on what type of uplink grant the UE has in a Transmission Time Interval, TTI, such as a pre-scheduled grant or a requested grant.

As will be discussed, the method may be performed only for Transmission Time Intervals, TTIs, when the wireless communication device has a pre-scheduled grant for uplink transmission.

As an example, the condition(s) for suppressing are configured by the network, specified in a specification, and/or determined by or preconfigured in the wireless communication device.

As already indicated, a UE or similar wireless communication device will send BSRs, and especially periodic BSRs, only if certain conditions are met.

As indicated, it may be desirable to avoid transmissions, and thus battery drain, for no other reason than sending of unnecessary BSR(s).

In a particular example, if only a BSR indicating less than or equal to a threshold amount of bytes, e.g. a BSR indicating buffer size zero, is up for transmission then drop/suppress/cancel that BSR.

In other words, when the UE has no (or little) data to send and only a BSR that would indicate a buffer size less than or equal to given threshold size (e.g. zero), the UE may decide to suppress or drop the BSR.

It is also possible, as a complement or an alternative, to check one or more previous BSRs to see whether they indicated less than or equal to a threshold amount of bytes. For example, if at least one of the X most recent BSRs indicated a buffer size less than or equal to Y, then drop/suppress/cancel the considered BSR. In this example, X is an integer greater than 1 and Y is a value that may be set to zero or some larger value.

In other words, the terminal may decide to suppress a BSR if the most recent BSR(s) has indicated zero, or less than or equal to Y bytes data in the UE's buffer, unless the UE has data in its buffer to avoid transmissions to conserve UE battery and radio resources. This is beneficial for example in a pre-scheduling scenario.

A particular benefit is that the terminal will refrain from sending unnecessary BSRs to the network while still allowing the terminal to send at least one BSR which indicates zero (or more generally a buffer size less than or equal to a threshold). Multiple subsequent/consecutive BSRs indicating zero which are not so useful for the network can thus be avoided.

In the following, specific non-limiting examples will be presented. Below is a set of conditions which the UE may apply when determining whether or not to send the BSR. The UE may apply one or more of the below conditions.

Examples of condition on value indicated in the previous BSR(s)

The UE drops a BSR if the (at least one of the) X most recent BSRs which the UE transmitted indicated a buffer size less than or equal to Y and the UE does not have any data, or less than or equal to Z bytes, in the buffers, else the UE sends the BSR.

The values X, Y and Z may be configured by the network, specified in a specification, or determined by the UE. Note that it would be possible that e.g. X is specified in a specification and Y signaled by the network.

If previous BSR(s) should be considered, X will be an integer equal to or greater than 1. By way of example, X may be set to 1, if desired, to ensure that the UE only considers the previous BSR. If previous BSR(s) should not be considered, X may be set to zero.

For example, Y may be set to zero, if desired, to ensure that the UE suppresses a BSR if the X most recent BSR indicated an empty buffer.

As an example, Z may be set to zero, if desired.

It should be appreciated that when it herein says that a BSR indicates zero it may comprise the case that the buffer size of all logical channel groups is zero.

In one particular embodiment the UE will not send a BSR which indicates zero, i.e. regardless of the values of the previous BSRs.

Examples of Condition on Network Indication

The UE may stop sending BSRs which indicates zero (or a buffer size less than or equal to Y), if the UE has received a certain indication from the network.

For example, if the UE has emptied its buffer and hence any BSR would indicate zero, then the UE would keep sending BSRs indicating zero, until the UE has received such an indication from the eNB. This condition ensures that the UE will only stop sending zero BSRs if the network has indicated that the UE is allowed to do so.

The network indication may be triggered or generated based on signaling from the terminal side, including BSRs.

The indication may be an uplink grant, a MAC CR, and so forth.

If later the UE gets new data in its buffers the BSR would of course indicate non-zero values. But when that new data has been sent then the UE may again start sending zero-BSRs, or BSRs indicating a buffer size less than or equal to Y, to the eNB until the network indication has been received again. So this can be seen as/implemented as a function where the UE goes back to not suppressing BSRs as soon as new data arrives.

In one embodiment the network may control the lifting of the restriction for sending BSRs.

Figure 3:
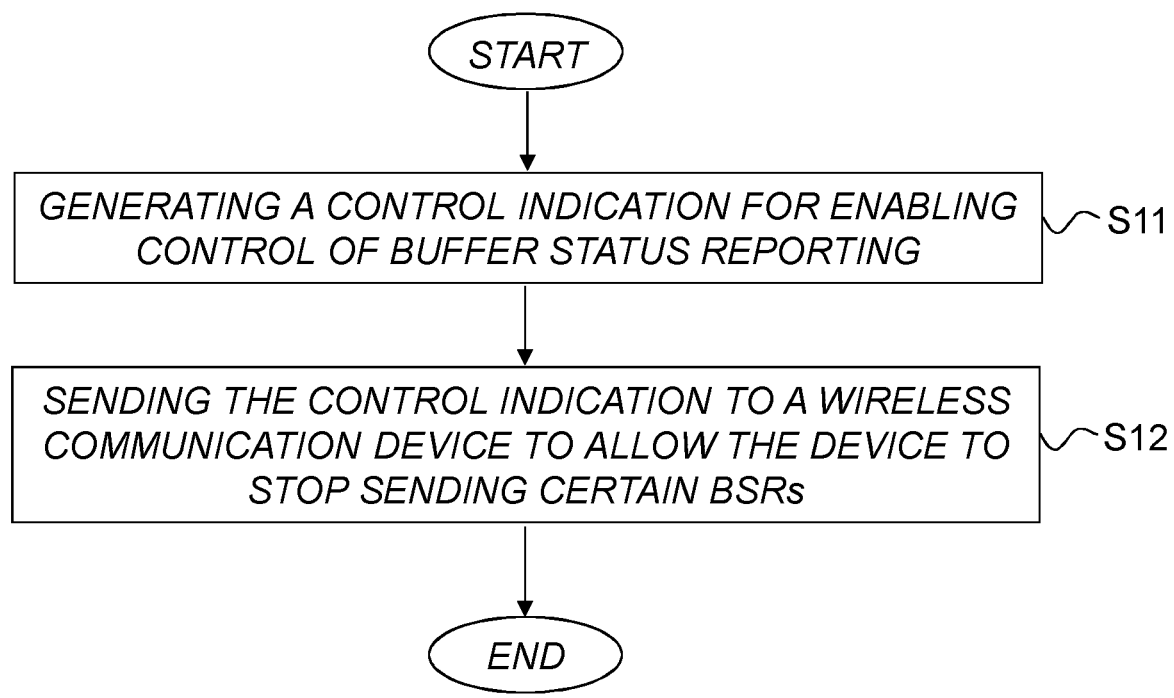
FIG. 3 is a schematic flow diagram illustrating an example of a method for controlling buffer status reporting in a wireless communication system.

FIG. 3 is a schematic flow diagram illustrating an example of a method for controlling buffer status reporting for a wireless communication device in a wireless communication system. The method basically comprises:

S11: Triggering or generating a control indication, or command, for enabling control of the buffer status reporting.

S12: Sending the control indication to the wireless communication device such as a UE or the like to allow the device to stop sending certain BSRs.

For example, the control indication may allow the device to at least temporarily stop sending BSRs that would indicate zero buffer size, or more generally would indicate a buffer size less than or equal to a given threshold.

By way of example, the method is normally performed from the network side, such as by a base station or the like.

A corresponding computer program would generate the control indication and output the indication for transmission to the wireless communication device.

Examples of Condition on Previously Dropped BSR(s)

According to current specifications, there are some rules according to which the UE drops/suppresses/cancels a BSR in case the UL grant(s) can accommodate all pending data available for transmission but is not sufficient to additionally accommodate the BSR MAC control element plus its subheader.

In one embodiment, the UE considers a BSR which was dropped due to the fact that it would have been indicating zero (or a buffer size less than or equal to Y), as a "BSR which the UE transmitted" and which indicated a buffer size of zero (or a buffer size less than or equal to Y). Hence the UE may, according to the embodiments in this document, refrain from sending a BSR if the previously BSR was dropped based on the rules described above.

Examples of Handling of Dropped BSRs

If the UE suppresses/drops/cancels a BSR that may imply that the UE never sends that BSR. This implies that a new BSR needs to be triggered before the UE can send a BSR.

Alternatively it may be so that the UE only delays a triggered BSR if the above conditions are met, until that the conditions for suppression, e.g. buffer is empty (or less than threshold) are no longer met or that the network lifts possible restriction(s).

Examples of which Earlier BSRs to Consider

The UE may only consider a certain type (or certain types) of BSR when determining whether the previous BSR was indicating zero or not. For example, "type" refers to periodic, regular, padding BSR or other BSR types which may be introduced in the future.

For example, the UE may only consider whether the previous periodic BSR indicated zero or not when determining whether to send a period BSR. In that case the UE would send a periodic BSR only if the most recent periodic BSR(s) did not indicate zero, but the UE would not consider e.g. the most recent regular BSR(s).

According to a particular example, relating to periodic BSRs, the terminal will only send a periodic BSR if the UE has data to transmit and a previous BSR did not indicate zero (or small) buffer size.

Examples of Change of Periodicity of BSR Reporting

Above it has been described how the UE will drop BSRs based on conditions. It would also be possible that the UE would change the periodicity for which the UE sends periodic BSRs based on some conditions. For example, the UE may apply a different periodic BSR period for the case when the UE has no (or less than or equal to Z bytes) data in the buffer, compared to when the UE has data in the buffer.

Examples of Consideration on Type of Uplink Transmission Opportunity

In one example embodiment the UE will apply the conditional periodic BSR transmission depending on what type of uplink grant the UE has in a TTI, e.g. pre-scheduled and requested grant. The UE may apply the conditional BSR transmission only for TTIs when the UE has a pre-scheduled grant, but not when the UE has a requested grant. If the UE has both a pre-scheduled grant and a requested grant for a TTI, then the UE may refrain from applying the conditional periodic BSR reporting, and hence send the periodic BSR without applying the conditions described herein.

If the UE in a TTI has both a pre-scheduled grant and a requested grant the UE may select to send the BSR using the requested grant.

Examples of when to Apply the Conditional BSR Reporting

Whether and which of the above conditions the UE applies may be configured by the network. This could for example be configured via RRC signaling.

Another possibility is that it is specified in a specification whether and which conditions the UE applies.

Another possibility is that whether and which conditions the UE applies is pre-configured in the UE; for instance stored in the USIM or similar.

Possible Implementation Examples

Below is two possible implementation examples, here given in pseudo code, which the UE may apply when sending BSRs which applies to some of the embodiments described herein.

Example 1

---

```
If not only BSR indicating zero bytes is to be transmitted in this
transmission opportunity:
     make transmission (including BSR if needed)
else
     if not (the X latest reported/transmitted BSR(s) indicated zero
bytes)
          make transmission (including BSR if needed)
     else
          drop/suppress/cancel the BSR
End
```

Example 2

```
If BSR is to be transmitted in this TTI:
    If the previous BSR indicated zero bytes and the UE does not have
    any data in the buffers:
        Not send the BSR
    Else
        Send the BSR
    End
End
```

Typically, the UE does not consider a pending periodic BSR when evaluating when to trigger a transmission.

It should also be appreciated there may be additional, existing or new, conditions for when to send and when to suppress BSRs and one or more of these may be applied in addition to the conditions described herein.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits, ASICs.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

In a particular example, the apparatus comprises a processor and a memory, said memory comprising instructions executable by the processor, whereby the apparatus/processor is operative to perform buffer status reporting and/or to enable control of the buffer status reporting.

According to an aspect of the proposed technology, there is provided an arrangement configured to manage buffer status reporting for a wireless communication device in a wireless communication system, The arrangement is configured to check condition(s) for suppressing at least one Buffer Status Report, BSR, which is up for transmission, and the arrangement is further configured to suppress the BSR if the condition(s) is/are fulfilled.

More specifically, the arrangement is configured to suppress the BSR:
when the BSR indicates less than or equal to a first threshold amount of bytes,
and/or
when one or more previous BSRs indicate less than or equal to a second threshold amount of bytes.

In a particular example, the arrangement is configured to suppress the BSR:
when the BSR indicates that the wireless communication device has less than or equal to Z bytes in the buffer(s), where Z is a value equal to or larger than zero,
and/or
when the X most recent BSR(s) transmitted by the wireless communication device indicated less than or equal to Y bytes in the buffer(s), where X is an integer equal to or greater than 1 and Y is a value equal to or greater than zero.

Optionally, the arrangement is configured to manage a BSR for which a timer has expired and/or the wireless communication device has valid uplink resources for transmitting the BSR.

As an example, the arrangement may be configured to manage a periodic BSR.

As indicated, the arrangement may comprise a processor and a memory, the memory comprising instructions executable by the processor, whereby the apparatus/processor is operative to enable control of the buffer status reporting.

According to a complementary aspect of the proposed technology, there is provided an arrangement configured to control buffer status reporting for a wireless communication device in a wireless communication system, wherein the arrangement is configured to trigger or generate a control indication, or command, for enabling control of the buffer status reporting, and to send the control indication to the wireless communication device to allow the device to stop sending certain Buffer Status Reports, BSRs.

By way of example, the arrangement may be configured to send control indication to allow the device to at least temporarily stop sending BSRs that would indicate a buffer size less than or equal to a given threshold.

Figure 4:
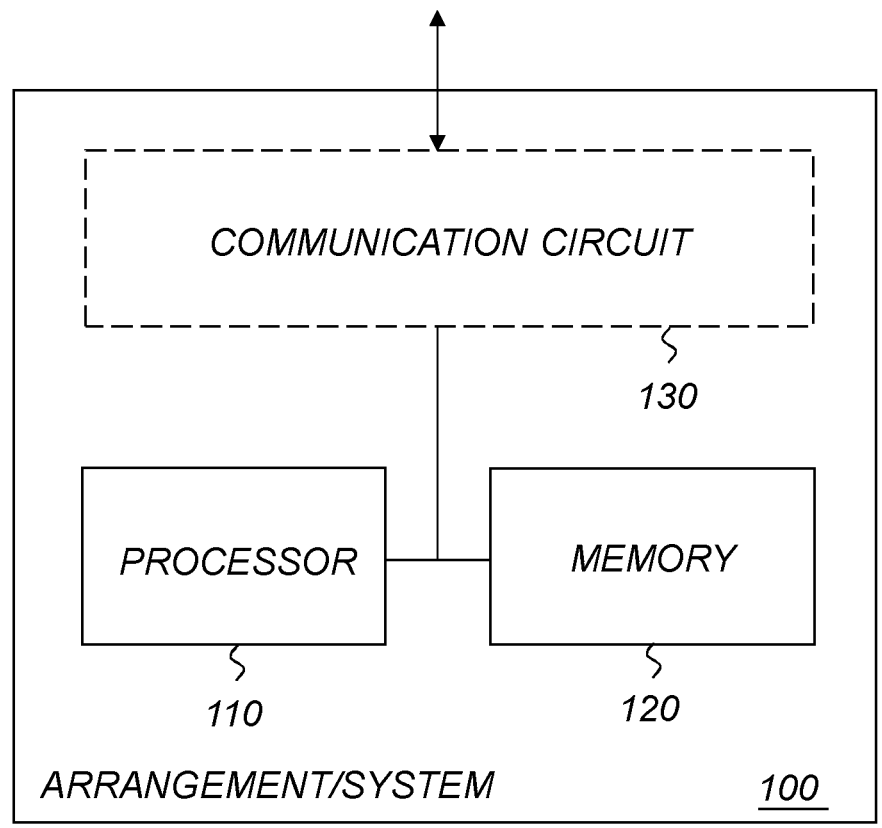
FIG. 4 is a schematic block diagram illustrating an example of an arrangement/system comprising a processor and an associated memory.

FIG. 4 is a schematic block diagram illustrating an example of an arrangement/system 100 comprising a processor 110 and an associated memory 120.

Optionally, the arrangement/system 100 may also include a communication circuit 130. The communication circuit 130 may include functions for wired and/or wireless communication with other devices and/or network nodes in the network. In a particular example, the communication circuit may be based on radio circuitry for communication with one or more other nodes, including transmitting and/or receiving information. The communication circuit 130 may be interconnected to the processor 110 and/or memory 120.

Figure 5:
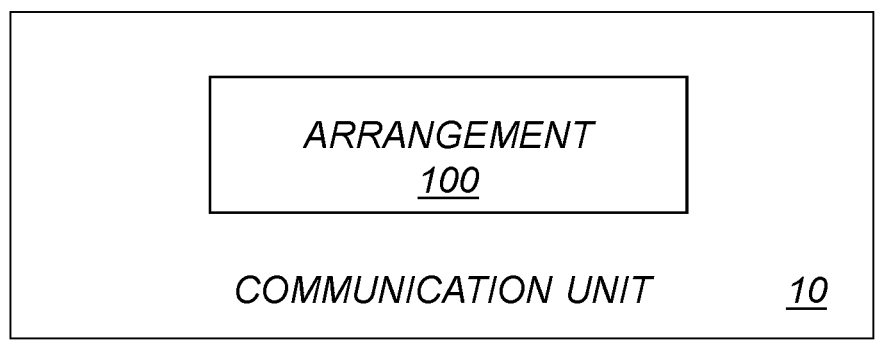
FIG. 5 is a schematic block diagram illustrating a communication unit comprising an arrangement of FIG. 4.

FIG. 5 is a schematic block diagram illustrating a communication unit 10 comprising an arrangement 100.

When the arrangement 100 is configured to manage or perform buffer status reporting in a wireless communication system, the communication unit 10 may for example be a wireless communication device such as a UE or the like.

When the arrangement 100 is configured to control buffer status reporting in a wireless communication system, the communication unit 10 may for example be a network node such as a base station, access point or the like.

Figure 6:
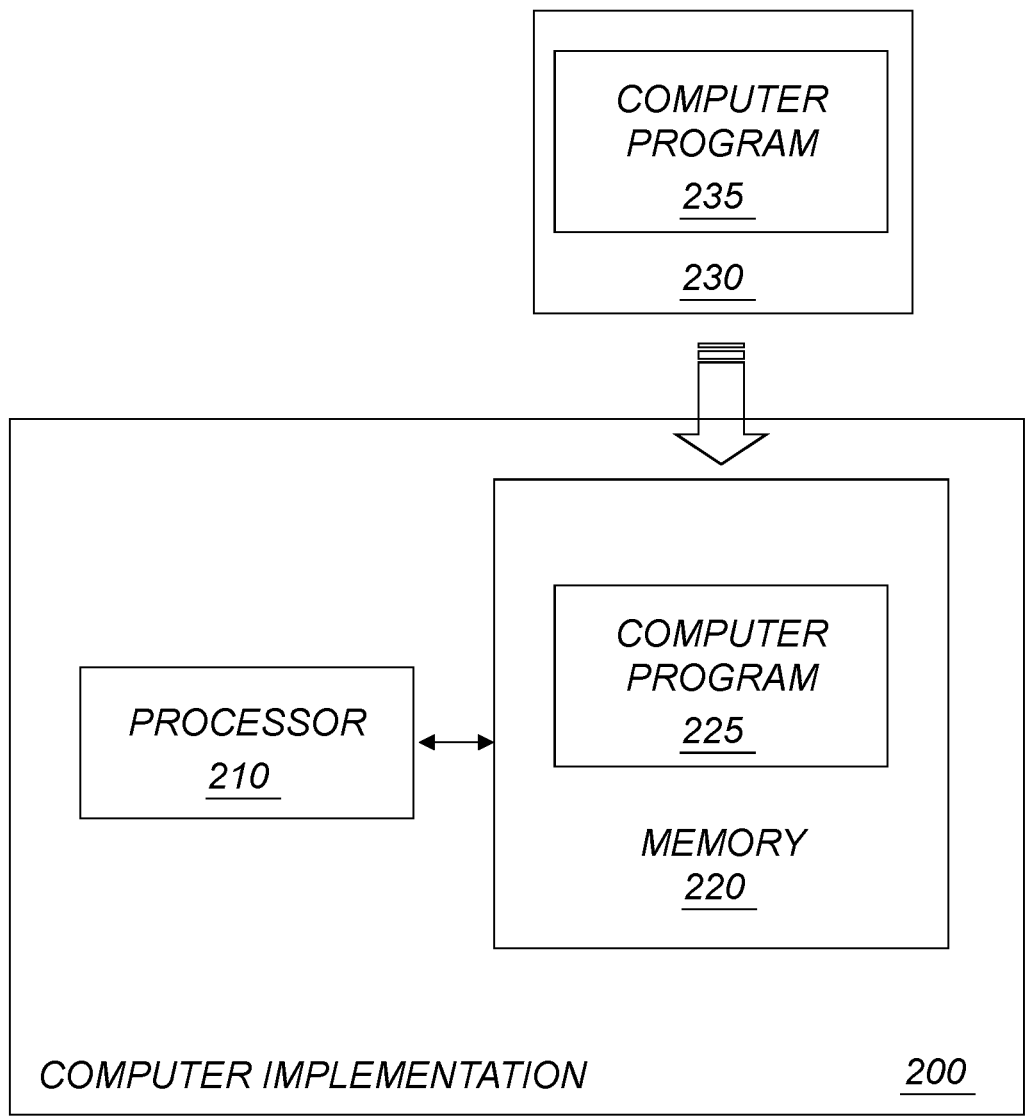
FIG. 6 is a schematic diagram illustrating an example of a computer implementation according to an embodiment.

FIG. 6 is a schematic diagram illustrating an example of a computer implementation according to an embodiment.

In this particular example, at least some of the steps, functions, procedures, modules and/or blocks described herein are implemented in a computer program 225; 235, which is loaded into the memory 220 for execution by processing circuitry including one or more processors 210.

The processor(s) 210 and memory 220 are interconnected to each other to enable normal software execution. An optional input/output device may also be interconnected to the processor(s) and/or the memory to enable input and/or output of relevant data such as input parameter(s) and/or resulting output parameter(s).

By way of example, there is provided a computer program for managing, when executed by a processor, buffer status reporting for a wireless communication device in a wireless communication system. The computer program comprises instructions, which when executed by the processor, cause the processor(s) to:
   check condition(s) for suppressing at least one Buffer Status Report, BSR, which is triggered and up for transmission, and
   suppress the BSR if the condition(s) is/are fulfilled,
wherein the BSR is suppressed:
when the BSR indicates less than or equal to a first threshold amount of bytes,
and/or
when one or more previous BSRs indicate less than or equal to a second threshold amount of bytes.

According to a complementary aspect, there is also provided a computer program for controlling, when executed by a processor, buffer status reporting for a wireless communication device in a wireless communication system. The computer program comprises instructions, which when executed by the processor, cause the processor(s) to:
   trigger or generate a control indication, or command, for enabling control of the buffer status reporting, and
   output the control indication for transmission to the wireless communication device to allow the device to stop sending certain Buffer Status Reports, BSRs.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, the computer program 225; 235 comprises instructions, which when executed by at least one processor, cause the processor(s) to perform buffer status reporting and/or to enable control of the buffer status reporting, as described herein.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 225; 235 may be realized as a computer program product, which is normally carried or stored on a computer-readable medium 220; 230, in particular a non-volatile medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Blu-ray disc, a Universal Serial Bus, USB, memory, a Hard Disk Drive, HDD, storage device, a flash memory, a magnetic tape, or any other conventional memory device. The computer program may thus be loaded into the operating memory of a computer or equivalent processing device for execution by the processing circuitry thereof.

The flow diagram or diagrams presented herein and/or the presented pseudo code may be regarded as a computer flow diagram or diagrams, when performed by one or more processors. A corresponding apparatus may thus be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 7:
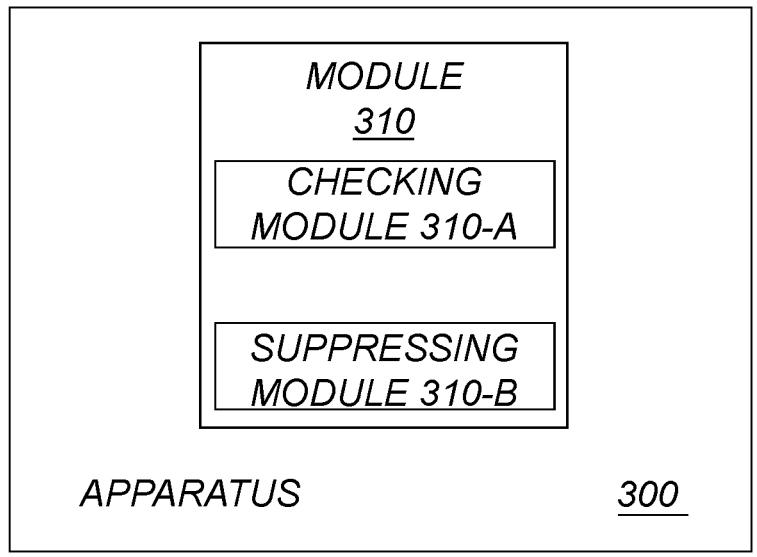
FIG. 7 is a schematic diagram illustrating an example of an apparatus for buffer status reporting in a wireless communication system.

FIG. 7 is a schematic diagram illustrating an example of an apparatus for managing buffer status reporting for a wireless communication device in a wireless communication system. The apparatus 300 comprises a module 310 for performing functions and/or actions described herein.
   More specifically, the apparatus 300 comprises:
      a checking module 310-A for checking condition(s) for suppressing at least one Buffer Status Report, BSR, which is triggered and up for transmission, and
      a suppressing module 310-B for suppressing the BSR if the condition(s) is/are fulfilled
wherein the BSR is suppressed:
when the BSR indicates less than or equal to a first threshold amount of bytes,
and/or
when one or more previous BSRs indicate less than or equal to a second threshold amount of bytes.

Figure 8:
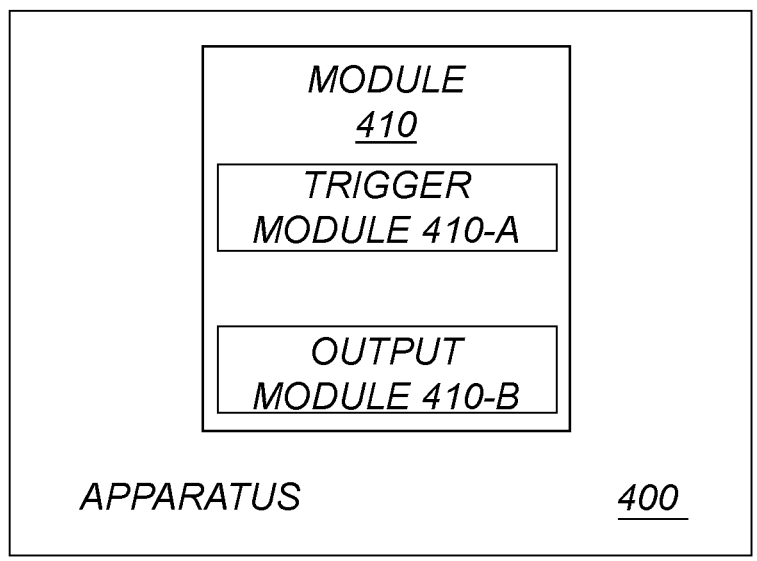
FIG. 8 is a schematic diagram illustrating an example of an apparatus for enabling control of buffer status reporting in a wireless communication system.

FIG. 8 is a schematic diagram illustrating an example of an apparatus for enabling control of buffer status reporting for a wireless communication device in a wireless communication system. The apparatus 400 comprises a module 410 for performing functions and/or actions described herein.
   More specifically, the apparatus 400 comprises:
      a trigger or generating module 410-A for triggering or generating a control indication, or command, for enabling control of the buffer status reporting, and
      an output module 410-B for outputting the control indication for transmission to the wireless communication device to allow the device to stop sending certain Buffer Status Reports, BSRs.

Alternatively it is possibly to realize the modules in FIG. 7 and FIG. 8 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits, ASICs, as previously mentioned. Other examples of usable hardware include input/output, I/O, circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for managing buffer status reporting for a wireless communication device in a wireless communication system, wherein the method comprises:
   receiving a grant from a radio network node in the wireless communication system, the grant pre-scheduling uplink resources for the wireless communication device;
   maintaining a periodic timer for triggering transmission of periodic Buffer Status Reports (BSRs) on corresponding ones of the pre-scheduled uplink resources; and
   suppressing transmission of at least one of the periodic BSRs, in dependence on whether or how much uplink data is available for transmission from the wireless device;
   wherein suppressing transmission of at least one of the periodic BSRs, in dependence on whether or how much uplink data is available for transmission from the wireless device comprises suppressing transmission of a current one of the periodic BSRs rather than transmitting the current periodic BSR, if an amount of uplink data available for transmission from the wireless communication device does not exceed a defined threshold and fewer than a maximum number of consecutively preceding ones of the periodic BSRs have been suppressed.

2. The method of claim 1, wherein suppressing transmission of at least one of the periodic BSRs comprises suppressing transmission of up to a defined number of the periodic BSRs, provided that an amount of uplink data available for transmission from the wireless device remaining below a first threshold, and, after suppressing the defined number of the periodic BSRs, transmitting the next periodic BSR.

3. The method of claim 2, wherein, while suppressing up to the defined number of the periodic BSRs, the method further comprises terminating the suppression and transmitting a next one of the periodic BSRs, if the amount of uplink data available for transmission from the wireless communication device exceeds a second threshold that is the same or higher than the first threshold.

4. The method of claim 1, wherein the method further comprises adjusting the periodicity of the periodic BSRs, responsive to suppressing transmission of one or more of the periodic BSR.

5. The method of claim 1, wherein the step of suppressing transmission of the at least one of the periodic BSRs further depends on the wireless communication device having received a network indication from the network, allowing the wireless communication device to perform the suppressing step.

6. A wireless communication device configured to manage buffer status reporting, the wireless communication device comprising:
   processing circuitry; and
   a memory, the memory comprising instructions executable by the processing circuitry, whereby the processing circuitry is operative to:
   receive a grant from a radio network node in the wireless communication system, the grant pre-scheduling uplink resources for the wireless communication device;
   maintain a periodic timer for triggering transmission of periodic Buffer Status Reports (BSRs) on corresponding ones of the pre-scheduled uplink resources; and
   suppress transmission of at least one of the periodic BSRs, in dependence on whether or how much uplink data is available for transmission from the wireless device;
   wherein, to suppress transmission of at least one of the periodic BSRs, the processing circuitry is configured to suppress transmission of a current one of the periodic BSRs rather than transmitting the current periodic BSR, if an amount of uplink data available for transmission from the wireless communication device does not exceed a defined threshold and fewer than a maximum number of consecutively preceding ones of the periodic BSRs have been suppressed.

7. The wireless communication device of claim 6, wherein, to suppress transmission of at least one of the periodic BSRs, the processing circuitry is configured to suppress transmission of up to a defined number of the periodic BSRs, provided that an amount of uplink data available for transmission from the wireless device remaining below a first threshold, and, after suppressing the defined number of the periodic BSRs, transmit the next periodic BSR.

8. The wireless communication device of claim 6, wherein, while suppressing up to the defined number of the periodic BSRs, the processing circuitry is configured to terminate the suppression and transmit a next one of the periodic BSRs, if the amount of uplink data available for transmission from the wireless communication device exceeds a second threshold that is the same or higher than the first threshold.

* * * * *